June 4, 1963   J. C. NOVELLO   3,092,076
BIRD PERCH
Filed March 13, 1961
FIG. 1
FIG. 2
FIG. 3
FIG. 4
FIG. 5
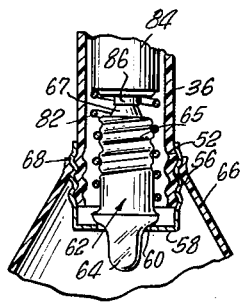
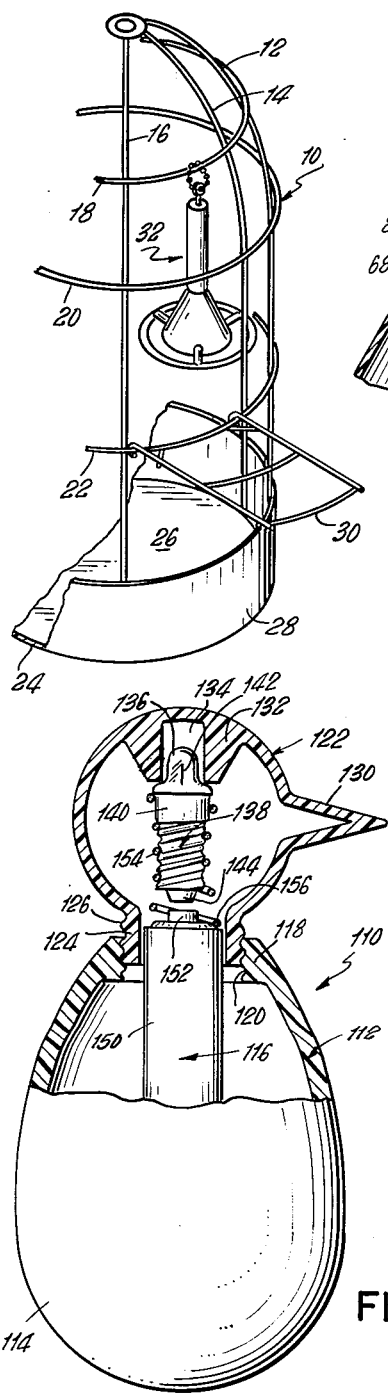
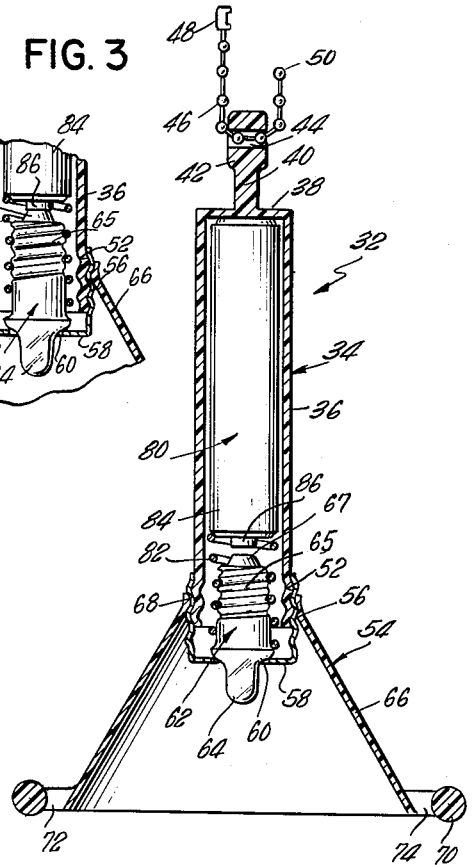
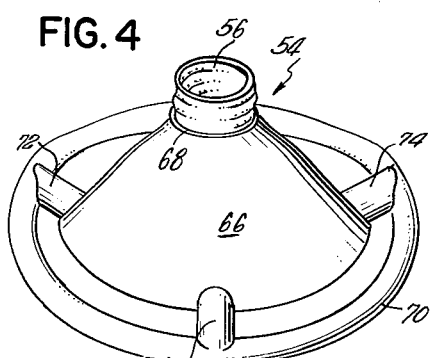
INVENTOR.
JOHN C. NOVELLO
BY Amster & Levy
ATTORNEYS

United States Patent Office 3,092,076
Patented June 4, 1963

3,092,076
BIRD PERCH
John C. Novello, 32 Coolidge St., North Bellmore, N.Y.
Filed Mar. 13, 1961, Ser. No. 95,278
5 Claims. (Cl. 119—26)

This invention relates to a device for use in animal husbandry, and more particularly to a parakeet toy for use in combination with a cage for a parakeet.

Various species of birds, such as parakeets, provide considerable pleasure to human beings as pets. These parakeets or other species of birds are generally kept in cages. Pet parakeets should be allowed to exercise by flying about the room or rooms of a home or other building in which they are kept and, generally speaking when once allowed to fly out of the cage, it is often very hard to persuade the parakeet to return to its cage or to recapture the parakeet.

Parakeets should be provided with the toys for drawing their attention and for enabling them to pass the time of day quite happily in order that they may survive captivity with the greatest success. Further, swingable perches often provide considerable entertainment for the parakeet and for the pet owner who can enjoy watching the parakeet swing on such perch.

It is therefore an object of the present invention to provide a toy which can be used in combination with the cage of a parakeet, or other type of bird so as not only to provide a toy for the parakeet, and a perch for the parakeet, but also to enable the parakeet to be lured back into the cage.

A further object of the present invention is to provide means for luring a parakeet or like pet back into its cage which is conveniently installed in the cage so as to be capable of being readily actuated, and which means may be in the form of a light which is highly attractive to parakeets and the like.

An additional object of the invention is to provide a toy for use in combination with a cage for a parakeet or like pet which may be simply actuated so as to excite a lamp forming a part of the toy whereby the light emanating from the lamp will lure the parakeet or other pet back into the cage.

The concept of this invention features a parakeet toy for use in combination with a cage including a casing swingably mounted in the cage with a battery being provided in the casing. A movable member which may be in the form of a perch is threadedly adjustably secured to the casing so that a lamp which is normally pressed away from the battery by an electrically conductive spring may be urged against the battery to complete an operative electrical circuit to the lamp from the battery through the spring when the movable member is given a minor amount of movement.

Still further objects and features of this invention reside in the provision of a parakeet toy or the like that is simple in construction, inexpensive to manufacture, and highly attractive in appearance.

These, together with the various ancillary objects and features of the invention which will become apparent as the following description proceeds, are attained by this device for use in animal husbandry, a preferred embodiment of which is illustrated in the accompanying drawing, by way of example only, wherein:

FIG. 1 is a perspective view of an embodiment of the parakeet toy shown and installed in combination with a cage for a parakeet;

FIG. 2 is an enlarged vertical central sectional view of the toy shown with the lamp in a position spaced from the battery;

FIG. 3 is a partial sectional detailed view similar to FIG. 2 drawn on an enlarged scale illustrating the manner in which the lamp is urged into contact with the battery;

FIG. 4 is a perspective view illustrating the construction of the movable member which forms the perch which is one of the important elements of the invention; and FIG. 5 is a partial sectional detail view illustrating a modified form of the invention.

With continuing reference to the accompanying drawing wherein like reference numerals designate similar parts, 10 generally designates a conventional cage for a parakeet or like species of bird which includes a plurality of radially extending ribs 12, 14, 16, etc. as well as a plurality of vertically spaced rings 18, 20, 22, and 24. Attached to the ring 24 which forms the base ring is a floor 26 for the cage and a guard 28 may be provided at the bottom of the cage rising upward from the base 26. The cage may be covered with screening or with a fine meshwork and hingedly attached to one of the rings such as ring 22 is a door 30 for the purpose of providing an entrance into the cage. This door 30 is adapted to be closed when the parakeet or like pet is in the cage.

The invention further includes a toy generally indicated at 32 and adapted to be used in combination with the cage 10. The toy 32 includes a casing 34 having a cylindrical portion 36 terminating in an upper end wall 38 which has integrally molded therewith a stem 40 to which a mounting ring 42 is integrally attached. The casing 34 is preferably molded from any of a number of various synthetic plastic materials such as polystyrene, polyurethene, or polyvinylchloride. The mounting ring 42 is provided with a bore 44 through which a beaded chain 46 extends. The beaded chain has a clasp 48 at one end thereof so as to engage the bead or spherical member 50 at the other end thereof for securing the beaded chain over the horizontal ring 18 of the cage 10 or other suitable mounting member.

The other end of the cylindrical portion 36 is configurated to form threads 52. These threads are adapted to provide means for adjustably attaching a movable mounting member generally indicated at 54 thereto. The movable mounting member includes a threaded portion 56 for threaded engagement with the threads 52 of the cylindrical portion 36 of the casing 34. The threaded portion 56 has integral therewith an inwardly extending flange 58 which defines a central aperture 60 through which a lamp 62 is adapted to partially extend with the glass portion 64 of the lamp 62 extending outwardly and below the flange 58 and with the metallic shell 65 of the lamp 62 being retained within the casing 34. The lamp 62 further has a base contact 67.

The movable mounting member further includes a downwardly and outwardly diverging conical shaped perch 66 which is fixedly secured at 68 to the threaded portion 56. Surrounding the perch 66 is a perch ring 70 held thereto by radially extending ribs or spokes 72, 74, 76 so that the perch ring 70 is in space relation to the bottom of the conical perch 66. The perch 66 and the perch ring 70 provide means whereby the parakeet can readily support itself and stand on the toy with the perch 66 providing a means which can be readily struck by the parakeet or other pet to make the toy swing and provide entertainment for the pet. Perch 66 as well as the perch ring 70 and spokes 74 are preferably formed of a transparent or translucent material such as polyvinyl chloride, polystyrene, or polyurethene. By the use of such materials, light emanating from the lamp 62 will be transmitted through the perch 66 and even the perch ring 70 and the ribs or spokes 72, 74 and 76 will be illuminated.

A battery 80 is disposed in the casing 34 and is normally held in space relation to the lamp 62 by means of a spring 82 of a coil type which is disposed about the lamp 62 and engages the metallic shell 84 of the battery 80 which serves as one terminal of the battery. The other terminal 86 of the battery is opposed to the base contact 67 of the lamp and is spaced therefrom when the movable member 54 is in the position shown in FIG. 2. However, upon rotation of the movable member 54 for a predetermined amount, such as a quarter turn, the movable member 54 is advanced by its threaded portion 56 along the threads 52 and causes the contact base 67 to engage the terminal 86 of the battery completing an operative electrical circuit from the terminal 84 of the battery, through the spring 82, through the shell 65 to the filaments of the lamp 62, and thence from the filaments of the lamp 62 through the base contact 67 of the lamp 62, to the terminal 86 of the battery 80.

A toy 110 which simulates the configuration of a penguin or similar type animal is shown in FIG. 5. The toy 110 includes a casing 112 in the form of a body which has a spherical base 114 preferably weighted as with lead or other suitable material to form a seat for the lower end of a battery 116 which is positioned in the casing 112. The upper end of the body which is substantially hollow is provided with a thickened portion 118 and internally threaded as at 120. A movable member 122 has a neck portion 124 provided with external threading 126 so as to be threadedly engageable with the internal threads 120 of the casing 112. The movable member 122 is configurated to simulate the head of a penguin, bird or other simulated animal and may include configurations as at 130 which simulate the nose or other features of an animal. The movable member 122 is provided with an internal thickened portion 132 provided with a recess 134 for receiving the bulb 136 of a lamp 138. The lamp 138 includes a conductive shell 140, filaments 142, and base contact 144. The battery 116 is similar to the battery 80 and includes an outer conductive shell 150 and a terminal 152. A spring 154 is disposed about the shell 140 of the lamp 138 and normally urges the lamp 138 away from the battery 116 with the spring 154 having its lower-most coil 156 engaging the conductive shell 150 of the battery 116. The movable member 122 is preferably formed of a translucent or transparent light transmitting material such as polyvinyl chloride, polyurethene, or polystyrene. Upon rotation of the movable member 122, the threaded engagement of the neck portion 124 with the threads 120 will cause the lamp 138 to be lowered so that the base contact 144 engages terminal 152 to complete an operative electrical circuit from the battery shell 150 through the spring 152, through the shell 140 of the lamp 138 to the filaments 142 thereof, and thence from the filaments back to the base contact 144, to the terminal 152 of the battery 116.

The toy 110 is adaptedly placed in the cage on any suitable portion thereof such as the base 26. The parakeet can readily play with the toy and when the toy is swung by the parakeet applying its beak or part thereof to the toy, the toy will always recover the vertical position due to the fact that it is weighted at the spherical bottom portion 114 thereof. The center of gravity of the entire toy is adjacent the bottom 114 of the toy. When it is desired to lure the parakeet back into its cage, the door 30 is opened, after which the movable member 122 is given a quarter turn which causes the lamp 138 to be lowered into contact with the battery 116. Once the parakeet has been lured by the light emanating from the toy back into the cage, the movable member 122 is twisted in the opposite direction, cutting off the power of the lamp 138.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. In combination with a cage, a parakeet toy in said cage, said toy comprising a casing, means detachably secured to said casing for swingingly supporting said casing, in said cage, a battery in said casing, a movable parakeet perch threadedly adjustably secured to and depending from said casing, a lamp extending into said casing, an electrically conductive spring disposed between and electrically contacting said lamp and said battery normally urging said lamp and battery apart, said perch engaging said lamp so that upon movement of said perch towards said casing, said lamp is brought into electrical contact with said battery to complete an operative electrical circuit between said battery, said spring, and said lamp.

2. A parakeet toy for use in combination with a cage comprising a casing swingably mounted in said cage, a battery in said casing, a movable perch threadedly adjustably secured to said casing, a lamp, an electrically conductive spring disposed between and electrically contacting said lamp and said battery normally urging said lamp and said battery apart, said perch engaging said lamp so that upon movement of said perch towards said casing, said lamp is brought into electrical contact with said battery to complete an operative electrical circuit between said battery, said spring, and said lamp.

3. In combination with a cage, a parakeet toy in said cage, said toy comprising a casing, means detachably secured to said casing for swingingly supporting said casing in said cage, a battery in said casing, a movable parakeet perch threadedly adjustably secured to and depending from said casing, a lamp extending into said casing, an electrically conductive spring disposed between and electrically contacting said lamp and said battery normally urging said lamp and battery apart, said perch engaging said lamp so that upon movement of said perch towards said casing, said lamp is brought into electrical contact with said battery to complete an operative electrical circuit between said battery, said spring, and said lamp, said perch including a substantially conical shaped portion having its widest portion at the bottom thereof, a peripheral ring surrounding said conical shaped portion and being spaced therefrom, and means attaching said ring to said conical shaped portion.

4. In the combination according to claim 1, said means detachably secured to said casing for swingingly supporting said casing in said cage including a beaded chain, and a clasp member at one end of said beaded chain for engaging and holding the other end of said beaded chain.

5. In combination with a cage, a parakeet toy in said cage, said toy comprising a casing, means detachably secured to said casing for swingingly supporting said casing in said cage, a battery in said casing, a movable parakeet perch threadedly adjustably secured to and depending from said casing, a lamp extending into said casing, an electrically conductive spring disposed between and electrically contacting said lamp and said battery normally urging said lamp and battery apart, said perch engaging said lamp so that upon movement of said perch towards said casing, said lamp is brought into electrical contact with said battery to complete an operative electrical circuit between said battery, said spring, and said lamp, said perch being formed of a light transmitting material and being widest at the bottom thereof.

References Cited in the file of this patent

UNITED STATES PATENTS

| | | |
|---|---|---|
| 1,595,146 | Ford | Aug. 10, 1926 |
| 2,249,690 | Gelardin | July 15, 1941 |
| 2,611,214 | Schur | Sept. 23, 1952 |
| 2,618,893 | Gelardin et al. | Nov. 25, 1952 |
| 2,718,209 | Ross | Sept. 20, 1955 |